United States Patent [19]
Liebtrau et al.

[11] Patent Number: 5,717,175
[45] Date of Patent: Feb. 10, 1998

[54] METHOD AND APPARATUS FOR TESTING AN ELEVATOR SPEED LIMITER

[75] Inventors: Christoph Liebtrau, Menziken; Hanspeter Mattli, Dorfstrasse, both of Switzerland

[73] Assignee: Inventio AG, Hergiswil NW, Switzerland

[21] Appl. No.: 612,977

[22] Filed: Mar. 6, 1996

[30] Foreign Application Priority Data

Mar. 10, 1995 [CH] Switzerland .................. 00695/95

[51] Int. Cl.⁶ .................................................. B66B 1/34
[52] U.S. Cl. ................................. 187/393; 187/287
[58] Field of Search .......................... 73/2; 187/287, 187/393, 391

[56] References Cited

U.S. PATENT DOCUMENTS 4,322,712  3/1982  Yoshida ............................ 187/287

FOREIGN PATENT DOCUMENTS 56-148061  11/1981  Japan .
5-294579   11/1993  Japan ............................ 187/393
6-271237   9/1994   Japan ............................ 187/391
06336379   12/1994  Japan ............................ 187/391

OTHER PUBLICATIONS

American National Standard Safety code for Elevators, Dumbwaiters, Escalators and Moving Walks. ANSI A17.1–1978 (pp. 94–96, 203, Dec. 17, 1979.

*Primary Examiner*—Robert Nappi
*Attorney, Agent, or Firm*—William J. Clemens

[57] ABSTRACT

An apparatus for testing a speed limiter in an elevator installation includes a drive wheel engaging a cable groove of a cable guide roller in the speed limiter. The drive wheel is rotated by rotational device having a speed control for linearly increasing the speed of rotation of the cable guide roller until the speed limiter is triggered. The rotation of the drive wheel is detected by an evaluating device attached to the rotational device and having an opti-electronic system for generating a light beam toward reflectors on the drive wheel and detecting reflected light beams. The triggering instant of the speed limiter is detected by an acceleration sensor connected to the evaluating device which then calculates the triggering speed from the speed of the drive wheel at the triggering instant.

18 Claims, 3 Drawing Sheets

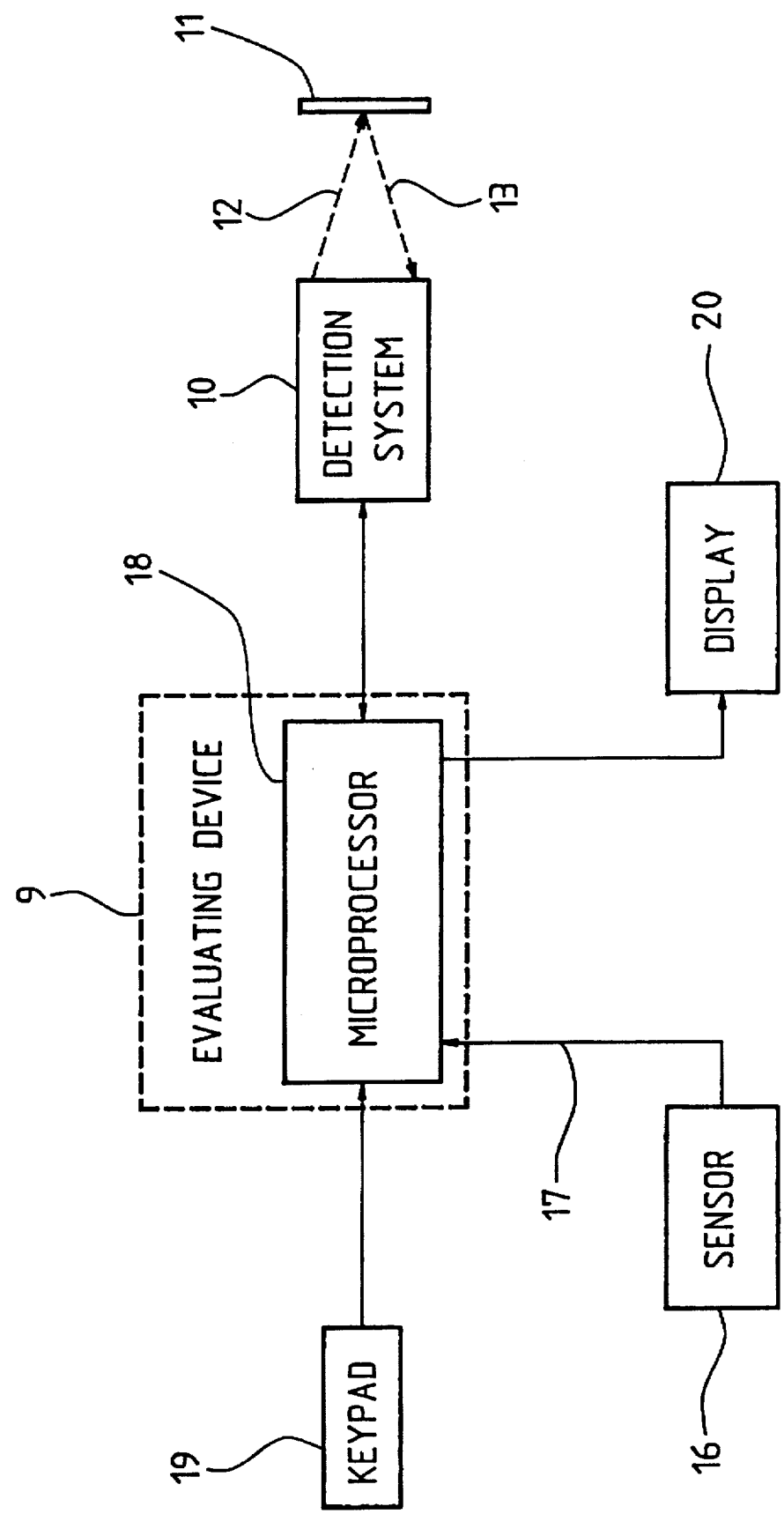

METHOD AND APPARATUS FOR TESTING AN ELEVATOR SPEED LIMITER

BACKGROUND OF THE INVENTION

The present invention relates generally to a method and apparatus for testing a speed limiter of a elevator installation and in particular to testing the speed limiter without moving the elevator car.

Elevators must be equipped with a safety device which is actuated by a speed limiter when the normal speed of travel is exceeded by a predetermined value. When the speed limiter is triggered and the safety device is actuated, the car is stopped with a large negative acceleration which applies high stresses to the elevator components and moreover requires appreciable effort to restore the operational readiness of the elevator. It is therefore advantageous to test the speed limiter to ascertain the response threshold of the trigger mechanism by simulation of excess speed.

Many known speed limiters have a cable guide roller with a groove for retaining a limiter cable connected to the elevator car. As the car moves, the limiter cable rotates the roller and the speed of rotation is detected by the speed limiter. One solution to simulating excess speed for such a speed limiter has been to provide a second cable groove in the roller, which groove is smaller than the cable groove used for the normal operation. When testing the speed limiter, the limiter cable is moved into the second cable groove and the elevator car is caused to travel at normal speed. Thereby, an excess speed, at which the safety device is triggered, is simulated for the trigger mechanism of the speed limiter. Usually, the stopping wedges of the safety device are switched out for such test travels so that the car is not stopped by the safety device. Thus, test travels can be repeated several times without further effort.

A disadvantage of this known method and equipment is that whether the speed limiter triggers or not is the only function tested. Beyond that, it is problematic for safety reasons to test at the excess speed with the travelling elevator car.

SUMMARY OF THE INVENTION

The present invention concerns a method and an apparatus for testing a speed limiter in an elevator installation, the speed limiter having a limiter cable attached to an elevator car and driving a cable guide roller coupled to the speed limiter. The method does not require movement of the elevator car and includes the steps of: a)A method for testing a speed limiter in an elevator installation, the speed limiter having a limiter cable attached to an elevator car and driving a cable guide roller coupled to the speed limiter, comprising the steps of: removing a speed limiter cable from a speed limiter cable guide roller coupled to an elevator speed limiter; driving the cable guide roller with a rotational device at an increasing speed to at least a triggering speed of the speed limiter; sensing triggering of the speed limiter; detecting a speed of the rotational device when the triggering of the speed limiter is sensed; and calculating a triggering speed of the speed limiter from the detected speed of the rotational device when the triggering of the speed limiter is sensed and determining whether the speed limiter is operating properly based upon the calculated triggering speed.

The apparatus according to the present invention includes a drive wheel having a periphery for engaging a cable guide roller of a speed limiter in an elevator installation and a surface with a plurality of reflectors attached thereto, a rotational device coupled to the drive wheel for rotating the drive wheel, a speed control connected to the rotational device for controlling rotation of the drive wheel at an increasing speed to trigger the speed limiter and a sensor means for attachment to the speed limiter and generating a trigger output signal upon detection of a triggering of the speed limiter. The apparatus further includes an opti-electrical detection device for generating a light beam toward the drive roller surface and generating a reflector output signal in response to a reflected light beam from the reflectors and an evaluating device connected to the sensor means and to the opti-electrical detection device and being responsive to the trigger output signal and the reflector output signal for calculating a triggering speed of the speed limiter.

The evaluating device includes a microprocessor for calculating the trigger speed from a set of formulas taking into account the active rolling diameter of the drive wheel, the number of the reflectors on the drive wheel, a time difference between two successive reflected light beams. The apparatus includes a data input means connected to the evaluating means for inputting information used to calculate the triggering speed and a display means connected to the evaluating means for displaying a visual representation of the triggering speed.

The present invention avoids the disadvantages of the known method and equipment by ascertaining the exact trigger point of the speed limiter.

An advantage of the present invention is that the testing of the speed limiter is readily repeatable at the elevator site by simple means and with little effort.

Another advantage of the present invention is that more information about the reliability of the test and speed limiters can be obtained by a series of tests and with the ascertaining of the exact triggering point.

A further advantage of the present invention is that more accurate measurement results are achievable with less expenditure of time.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2b is a cross sectional view of the drive wheel taken along the line A—A in the FIG. 2a.

FIG. 5 is a block schematic diagram of the evaluating device and associated components shown in the FIG. 1.

DESCRIPTION OF THE PREFERRED EMBODIMENT

Figure 1:
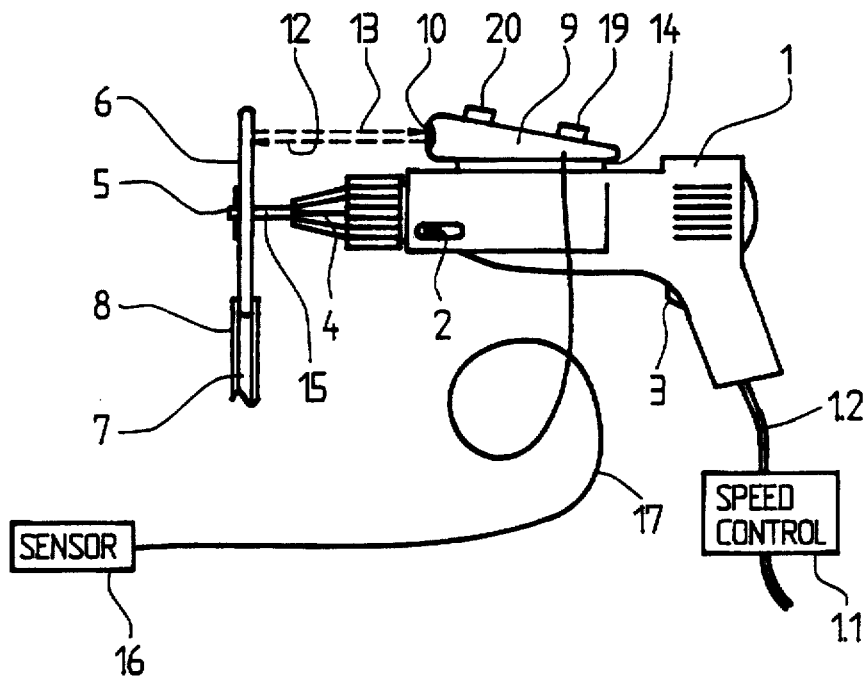
FIG. 1 is front elevation view of an apparatus for testing an elevator speed limiter in accordance with the present invention.

There is shown in the FIG. 1 an apparatus for testing a speed limiter in an elevator installation which apparatus includes a rotational device 1, such as a conventional, commercially available drill, having the speed of rotation controlled by a speed regulation circuit. The rotational device 1 has a change-over switch 2 for reversing the direction of rotation and a trigger switch 3 for turning the device on and off. The speed regulation circuit includes a speed control which, after the actuation of the switch 3, automatically increases the rotational speed of the rotational device 1 linearly. The speed regulation circuit can be built into the rotational device 1, or connected as a speed control 1.1 in an electrical power cord 1.2 supplying power to the rotational device. The rotational device 1 also has a rotationally driven chuck 4 which releasably retains one end of an axle 5 on which a drive wheel 6 is mounted. As explained below, a periphery of the drive wheel 6 engages a cable groove 7 formed in a periphery of a cable guide roller 8 and drives the roller in rotation as the rotational device 1 rotates the chuck 4. The cable guide roller 8 is a component of a not illustrated elevator speed limiter which is to be tested for proper operation. During normal operation of the elevator system, the cable guide roller 8 changes the direction of a path of travel of a not illustrated limiter cable which engages the cable groove 7 and is driven by an elevator car movable in an elevator shaft to rotate the roller. In the case of excess speed of the elevator car, the speed limiter blocks the cable guide roller 8 from rotation, whereby the limiter cable triggers a stopping device such as a guide rail engaging brake on the elevator car.

Figure 2A:
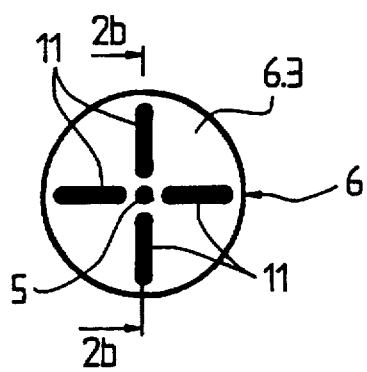
FIG. 2a is side elevation view of the drive wheel shown in the FIG. 1.
Figure 2C:
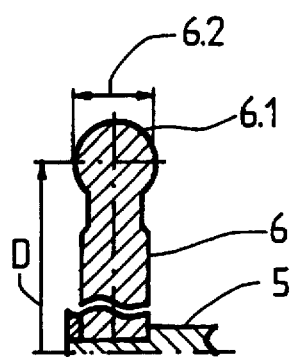
FIG. 2c is an enlarged view of a portion of the drive wheel designated by "B" in the FIG. 2b.
Figure 2B:
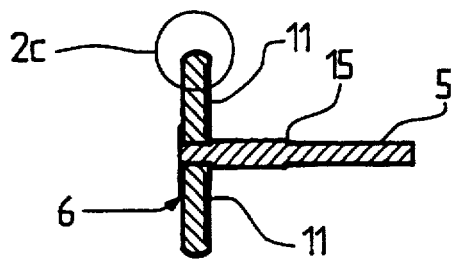

In order to test the speed limiter without moving the elevator car, the limiter cable is removed from the cable guide roller 8 and the drive wheel 6 is positioned to engage the groove 7. The cable guide roller 8 is then driven in rotation by the rotational device 1 through the drive wheel 6 at a linearly rising speed up to the triggering point of the speed limiter. The rotational movement of the drive wheel 6 is detected and evaluated by an evaluating device 9 which has a computing means responsive to a reflector output signal generated by an opti-electronic detection system 10 mounted at a front end of the evaluating device facing the drive wheel. As shown in the FIG. 2a, a plurality of reflectors 11 are attached to a planar surface 6.3 of the drive wheel 6. As shown in the FIG. 1, the reflectors 11 reflect a beam of light 12 emitted by the opti-electronic detection system 10 as a reflected light beam 13. The opti-electronic detection system 10 responds to the reflected light beam by generating the reflector output signal to the computing means in the evaluating device 9. The evaluating device 9 is precisely and detachably attached to the rotational device 1 by a fastening means 14 for the proper alignment of the beams 12 and 13. Furthermore, as shown in the FIGS. 2a and 2b, the axle 5 includes an increased diameter portion 15 which abuts the chuck 4 to space the drive wheel 6 a predetermined distance from the opti-electronic detection system 10.

The speed of the cable guide roller 8 is slowly increased linearly by the frictional contact with the drive wheel 6 being rotated by the rotational device 1 up to the triggering point of the speed limiter. The triggering instant is detected by an acceleration sensor 16 which is detachably connected with the speed limiter. The sensor 16 generates a trigger output signal which is transmitted over a connecting cable 17 to the evaluating device 9. The evaluating device 9 utilizes the reflector output signal and the trigger output signal to calculate the speed at which the speed limiter triggered. The change-over switch 2 provides for reversal of the direction of rotation such that the apparatus for the testing operation of the speed limiter is independent of the direction of rotation.

Trials have shown that an optimum rolling diameter D (see the FIG. 2c) of the drive wheel 6 is approximately 110 millimeters. The optimum rolling diameter D has an advantageous effect on measurement errors and force transmission, and enables a slow running-up to the triggering speed. The drive wheel 6, for example, can be formed of an aluminum alloy and hard-anodized in a black finish. The contact between the surface periphery of the drive wheel 6 and the surface of the cable groove 7 of the cable guide roller 8 is directly metal on metal. The active rolling diameter D of the drive wheel 6 is thus accurately predetermined and the wear on the drive wheel is low. A running surface 6.1 of the drive wheel 6 is formed to be circularly round and has a diameter 6.2 which corresponds with the diameter of the limiter cable. The reflectors 11 are strip-shaped and are positioned symmetrically (see the FIG. 2b) about the axle 5 for the contactless measurement of the rotational speed. Because inaccurately positioned reflectors 11 can cause errors in the speed measurements, the reflectors can be punched out from a sheet of reflective material and positioned in milled grooves in the surface 6.3. The black anodizing of the drive wheel 6 absorbs the light beam 12 while the reflectors 11 produce the reflected light beam 13, which reflected beam is sensed and evaluated by the opti-electronic detection system 10.

At the triggering point, the speed limiter blocks the cable guide roller 8 suddenly. This reaction leads to the application of a strong shock to the speed limiter, generally above a negative acceleration value of ten g's, which value is detected by the acceleration sensor 16. The acceleration sensor 16 can be detachably attached to the speed limiter by any suitable means, such as a permanent magnet, for orienting the sensor in the direction of application of the shock to be sensed by the sensor.

The evaluating device 9, as shown in the FIG. 5, is controlled by a microprocessor 18 having an input connected to an input means 19 such as a keypad or keyboard. The opti-electronic detection system 10, which generates the light beam 12 and receives the reflected light beam 13 from the reflectors 11, has an input/output connected to an input/output of the microprocessor 18. Thus, the microprocessor 18 signals the detection system 10 to generate the light beam 12 and receives the reflector output signal when the reflected light beam 13 is detected. The evaluating device 9 also includes a display 20 connected to an output of the microprocessor 18 for visually indicating the triggering speed in meters per second (m/s), or in any other suitable form such as in revolutions per minute (rpm).

For the triggering speed measurement, the speed of the periphery of the drive wheel 6 in meters per second (m/s) is ascertained at the triggering point of the speed limiter. There is illustrated in the FIG. 3 a plot of speed (v) versus time (t) for the periphery of the drive wheel 6. A mean circumferential speed vm(t3) (measured value) for a time interval from a time t2 to a time t3 is computed at the time t3. The times t2 and t3 represent the detection of the reflected light beams 13 from two successive reflectors 11. The mean circumferential speed vm(t3) is calculated based upon the active rolling diameter D of the drive wheel 6, the number "n" of reflectors 11 and the time interval value "t3–t2" according to a formula:

$$vm(t3) = (D \cdot Pi)/(n \cdot (t3-t2))$$

Since deviations lead to measurement errors, the time difference "t3–t2" must be measured precisely, the drive wheel 6 must have exactly the rolling diameter D and the "n"

reflectors 11 must be positioned with equal spacing for accurate speed measurements according to the above formula wherein "Pi" is the circle constant having the value 3.1416 . . . .

Figure 3:
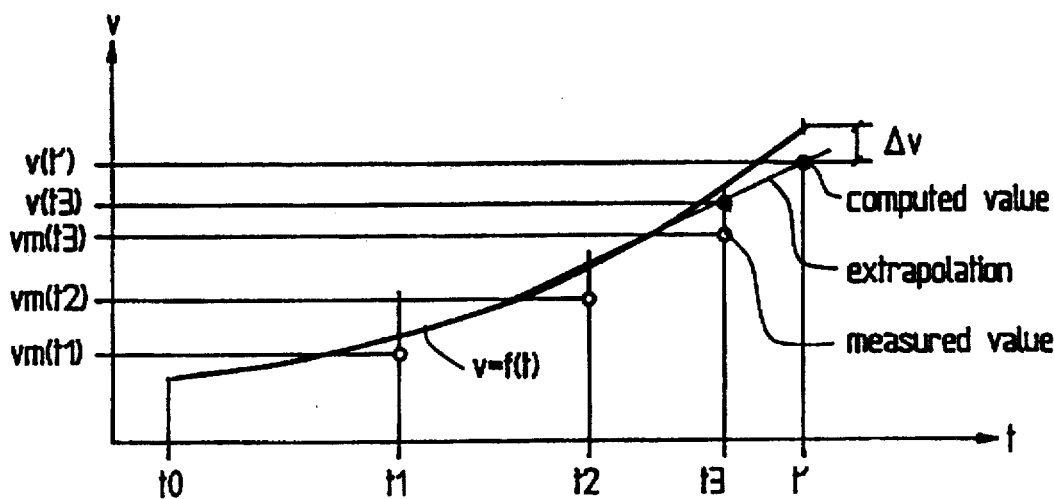
FIG. 3 is a plot of speed versus time at the periphery of the drive wheel shown in the FIG. 1.

Usually, the plot of speed as a function of time v=f(t), shown in the FIG. 3, is a straight line for which the increase in speed is linear at a constant acceleration "a" . Thus, the instantaneous speed in the middle of the time interval from t2 to t3 in that case has exactly the value vm(t3) wherein:

$$vm(t3)=v((t2+t3)/2)$$

The assumed constant acceleration "a" at the instant t2 can be computed from the value of vm(t3) and the corresponding speed value of the preceding time interval from a time t1 to the time t2 according to the formula:

$$a(t2)=(vm(t3)-vm(t2))/((t2-t1)+(t3-t2))/2$$

The instantaneous speed v(t3) is found by extrapolation from the acceleration a(t2) according to the formula:

$$v(t3)=vm(t3)+a(t2)\cdot(t3-t2)/2$$

From these relationships, a speed v(t') (computed value) at the circumference of the cable guide roller 8 at a triggering instant t' can be computed by extrapolation. On the assumption that the triggering instant t', which is detected by the acceleration sensor 16, lies in the time interval beyond the time t3, the following formula can be used:

$$v(t')=v(t3)+a(t2)\cdot(t'-t3)$$

When the acceleration "a" is not constant, then the speed v(t') is only approximately correct. For the estimation of the error, a computation is made of how fast the acceleration "a" changes. On the assumption that the acceleration "a" changes at most linearly, a corresponding constant "e" can be determined according to the formula:

$$e=(a(t2)-a(t1))/((t1-t0)/4+(t2-t1)/2+(t3-t2)/4)$$

The speed v(t') must be corrected by a value Δv for this constant acceleration change "e" according to the formula:

$$\Delta v=1/2\cdot e\{(t3-t2)/2+(t'-t3)\}^2$$

The measurement result is indicated as invalid in case the value of Δv deviates by more than ±q % from v(t'). The value of "q" is can be set in percent in the evaluating device 9 through the input means 19 and the microprocessor 18. Inaccuracies in the positioning of the reflectors 11, differences in the reflective properties of the reflectors, as well as vibrations of the evaluating device 9 likewise lead to measurement errors which influence the value of Δv. In practice, a value of approximately "q=5%" has worked as a basic setting.

Figure 4:
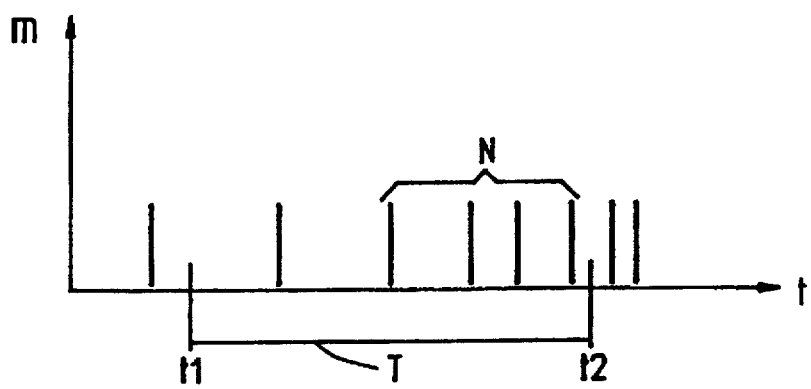
FIG. 4 is a plot of reflector output signal magnitude versus time during rotation of the drive wheel shown in the FIG. 1.

The FIG. 4 is a plot of the magnitude of the reflector output signal (m) versus time (t). As illustrated in the FIG. 4, a number N of the reflected light beams 13 is detected during a constant measurement time T between the time t1 and the time t2 for calculating the rotational speed of the drive wheel 6 in revolutions per minute. From this calculation, the mean rotational speed during the time interval from t1 to t2 is computed according to the formula:

$$rpm(t2)=(N/(n\cdot T))\cdot 60$$

The periphery of the drive wheel 6 can have traversed a distance equal to "(N±1)·D·Pi/n" for N counted reflected light beams 13. This uncertainty leads to a minimum number "N_min" of the reflected light beams 13 having to be counted for an accuracy of "±p %" according to the formula:

$$N\_min>100/p$$

In order to assure a minimum measurement accuracy "p", even for small rotational speeds (rpm_min), the measurement time T must correspondingly be chosen to be sufficiently long and/or the number "n" of the reflectors 11 must correspondingly be chosen to be sufficiently great according to the formula:

$$n\cdot T>6000/(rpm\_min\cdot p)$$

The measurement accuracy is only guaranteed when, for "n" greater than "1", the reflectors 11 are positioned at equal spacings and are always scanned at the same measurement position. The measurement time T and the number "n" of the reflectors 11 can be set individually in the evaluating device 9 through the input means 19 and the microprocessor 18 for the rotational speed measurement.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for testing a speed limiter in an elevator installation, the speed limiter having a limiter cable attached to an elevator car and driving a cable guide roller coupled to the speed limiter, comprising the steps of:

a. removing a speed limiter cable from a speed limiter cable guide roller coupled to an elevator speed limiter;

b. driving the cable guide roller with a rotational device at an increasing speed to at least a triggering speed of the speed limiter;

c. sensing triggering of the speed limiter by attaching an acceleration sensor to the speed limiter for generating a trigger output signal in response to the triggering of the speed limiter;

d. detecting a speed of the rotational device when the triggering of the speed limiter is sensed; and e. calculating a triggering speed of the speed limiter from the detected speed of the rotational device when the triggering of the speed limiter is sensed and determining whether the speed limiter is operating properly based upon the calculated triggering speed.

2. The method according to claim 1 wherein said step b. is performed by engaging a periphery of the cable guide roller with a periphery of a drive wheel coupled to the rotational device and driving the drive wheel in rotation.

3. The method according to claim 1 wherein said step b. is performed by engaging a periphery of the cable guide roller with a periphery of a drive wheel coupled to the rotational device and driving the drive wheel in rotation and said step d. is performed by directing a light beam at a surface on the drive wheel and detecting reflected light beams from reflectors on the drive wheel.

4. The method according to claim 3 wherein said step e. is performed by calculating a mean speed vm(t3) at a time t3 according to a formula, $$vm(t3)=(D\cdot Pi)/(n\cdot(t3-t2))$$

wherein D is an active rolling diameter of the drive wheel, Pi is the circle constant 3.1416 . . . , n is a number of the reflectors on the drive wheel and (t3–t2) is a time difference between two successive reflected light beams; by calculating a constant acceleration a(t2) according to a formula, $$a(t2)=(vm(t3)-vm(t2))/((t2-t1)+(t3-t2))/2$$

wherein (t2–t1) is a time difference preceding the time difference (t3–t2) and vm(t2) is a mean speed at the time t2; and by calculating by extrapolation from a value of the constant acceleration a(t2) an instantaneous speed v(t3) according to a formula, $$v(t3)=vm(t3)+a(t2)\cdot(t3-t2)/2.$$

5. The method according to claim 4 wherein said step d. is further performed by calculating by extrapolation the triggering speed v(t') according to the formula, $$v(t')=v(t3)+a(t2)\cdot(t'-t3)$$

wherein t' is the instant of triggering sensed in the step b. and t3 is the time at which a last reflected light beam was detected before the triggering instant t'.

6. The method according to claim 5 wherein said step d. is further performed by correcting the triggering speed v(t') is corrected according to a formula, $$\Delta v=1/2 \cdot e\{(t3-t2)/2+(t'-t3)\}2$$

wherein $$e=(a(t2)-a(t1))/((t1-t0)/4+(t2-t1)/2+(t3-t2)/4)$$

and (t1–t0) and (t2–t1) are preceding time differences.

7. The method according to claim 3 including a step of calculating a rotational speed in revolutions per minute according to a formula, $$rpm(t2)=(N/(n \cdot T)) \cdot 60$$

wherein N is a number of reflected light beams detected during a constant measurement time T=t2–t1 and n is a number of the reflectors on the drive wheel.

8. An apparatus for testing a speed limiter in an elevator installation, the speed limiter having a limiter cable attached to an elevator car and driving a cable guide roller coupled to the speed limiter, comprising:

a drive wheel having a periphery for engaging a cable guide roller of a speed limiter in an elevator installation;

a rotational device coupled to said drive wheel for rotating said drive wheel to a speed at least sufficient to trigger the speed limiter;

a sensor means for detecting a triggering instant of the speed limiter, said sensor means being an acceleration sensor for attachment to the speed limiter, said acceleration sensor generating a trigger output signal upon detection of a triggering of the speed limiter at an output; and an evaluating device positioned adjacent said drive wheel for detecting a speed of rotation of said drive wheel, said evaluating device having an input connected to said acceleration sensor output and being responsive to said trigger output signal for calculating a triggering speed the speed limiter from said drive wheel speed of rotation detected at said triggering instant.

9. The apparatus according to claim 8 wherein said drive wheel has a plurality of reflectors attached thereto and including an opti-electronic detection system which emits a light beam and detects reflected light beams from said reflectors for detecting said drive wheel speed of rotation, said opti-electronic detection system generating a reflector output signal at an output connected to an input of said evaluating device.

10. The apparatus according to claim 9 wherein said evaluating device includes computing means for calculating said triggering speed, said computing means being connected to said evaluating device input for receiving said reflector output signal generated by said opti-electronic detection system and being connected to said sensor means for receiving a trigger output signal generated by said sensor means.

11. The apparatus according to claim 8 wherein said rotational device includes a speed control for increasing said speed of rotation of said drive wheel linearly.

12. The apparatus according to claim 8 wherein said evaluating device includes a data input means for inputting information used to calculate said triggering speed.

13. The apparatus according to claim 8 wherein said evaluating means includes a display means for displaying a visual representation of said triggering speed.

14. An apparatus for testing a speed limiter in an elevator installation, the speed limiter having a limiter cable attached to an elevator car and driving a cable guide roller coupled to the speed limiter, comprising:

a drive wheel having a periphery for engaging a cable guide roller of a speed limiter in an elevator installation and a surface with a plurality of reflectors attached thereto;

a rotational device coupled to said drive wheel for rotating said drive wheel;

a speed control connected to said rotational device for controlling rotation of said drive wheel at an increasing speed to trigger the speed limiter;

an acceleration sensor means for attachment to the speed limiter and generating a trigger output signal upon detection of a triggering of the speed limiter;

an opti-electrical detection device for generating a light beam toward said drive roller surface and generating a reflector output signal in response to a reflected light beam from said reflectors; and an evaluating device connected to said acceleration sensor means and to said opti electrical detection device and being responsive to said trigger output signal and said reflector output signal for calculating a triggering speed of the speed limiter.

15. The apparatus according to claim 14 wherein said evaluating device includes a microprocessor for calculating said trigger speed by calculating a mean speed vm(t3) at a time 13 according to a formula, $$vm(t3)=(D \cdot Pi)/(n \cdot (t3-t2))$$

wherein D is an active rolling diameter of the drive wheel, Pi is the circle constant 3.1416 . . . , n is a number of the reflectors on the drive wheel and (t3–t2) is a time difference between two successive reflected light beams; by calculating a constant acceleration a(t2) according to a formula, $$a(t2)=(vm(t3)-vm(t2))/((t2-t1)+(t3-t2))/2$$

wherein (t2–t1) is a time difference preceding the time difference (t3–t2) and vm(t2) is a mean speed at the time 12;

by calculating by extrapolation from a value of the constant acceleration a(t2) an instantaneous speed v(t3) according to a formula, $$v(t3)=vm(t3)+a(t2)\cdot(t3-t2)/2;$$

and by calculating by extrapolation said triggering speed v(t') according to the formula, $$v(t')=v(t3)+a(t2)\cdot(t'-t3)$$

wherein t' is the instant of triggering and t3 is the time at which a last reflected light beam was detected before the triggering instant t'.

16. The apparatus according to claim 15 wherein said microprocessor corrects said triggering speed v(t') according to a formula, $$\Delta v=1/2\cdot e\{(t3-t2)/2+(t'-t3)\}^2$$

wherein $$e=(a(t2)-a(t1))/((t1-t0)/4+(t2-t1)/2+(t3-t2)/4)$$

and (t1–t0) and (t2–t1) are preceding time differences.

17. The apparatus according to claim 14 including a data input means connected to said evaluating means for inputting information used to calculate said triggering speed.

18. The apparatus according to claim 14 including a display means connected to said evaluating means for displaying a visual representation of said triggering speed.

* * * * *